United States Patent
Piccinini et al.

(10) Patent No.: US 9,519,410 B2
(45) Date of Patent: Dec. 13, 2016

(54) DYNAMIC PRESENTATIONS MANAGEMENT

(71) Applicant: International Business Machines Corporation, Armonk, NY (US)

(72) Inventors: Sandro Piccinini, Rome (IT); Luigi Pichetti, Rome (IT); Marco Secchi, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/856,112

(22) Filed: Sep. 16, 2015

(65) Prior Publication Data

US 2016/0004400 A1 Jan. 7, 2016

Related U.S. Application Data

(63) Continuation of application No. 13/325,088, filed on Dec. 14, 2011, now Pat. No. 9,141,620.

(30) Foreign Application Priority Data

Dec. 16, 2010 (EP) .................... 10195321

(51) Int. Cl.
*G06F 3/0481* (2013.01)
*G06F 3/0484* (2013.01)
*G06F 17/30* (2006.01)
*G06Q 30/02* (2012.01)
*H04L 12/58* (2006.01)

(52) U.S. Cl.
CPC ....... *G06F 3/0484* (2013.01); *G06F 17/30056* (2013.01); *G06Q 30/02* (2013.01); *H04L 51/046* (2013.01)

(58) Field of Classification Search
None
See application file for complete search history.

(56) References Cited

U.S. PATENT DOCUMENTS 6,108,001 A * 8/2000 Tuttle ...................... G09B 5/02
715/730
7,296,218 B2 11/2007 Dittrich
(Continued)

OTHER PUBLICATIONS

U.S. Appl. No. 13/325,088, Non-Final Office Action, filed Mar. 27, 2014, 10 pg.
(Continued)

*Primary Examiner* — Phenuel Salomon
(74) *Attorney, Agent, or Firm* — Cuenot, Forsythe & Kim, LLC

(57) ABSTRACT

A method for dynamic presentations management of electronic presentations including multiple slides, wherein each slide has at least one presentation constraint parameter assigned thereto, and wherein a presentation software is used for generating and displaying the presentation can include gathering metadata regarding the presentation by the presentation software, evaluating the metadata regarding the presentation and determining at least one presentation constraint parameter by the presentation software, and automatically arranging and/or selecting slides and/or modifying a content of slides according to the determined at least one presentation constraint parameter to be presented by use of the presentation software.

14 Claims, 4 Drawing Sheets

(56) References Cited

U.S. PATENT DOCUMENTS

| | | |
|---|---|---|
| 7,512,887 B2 | 3/2009 | Keohane et al. |
| 7,721,209 B2 | 5/2010 | Tilton |
| 7,975,226 B2 | 7/2011 | Blose et al. |
| 8,312,385 B2 | 11/2012 | Bier |
| 8,365,081 B1 | 1/2013 | Amacker et al. |
| 8,977,965 B1 * | 3/2015 | Ehlen ................ G06F 3/00 715/719 |
| 9,141,620 B2 | 9/2015 | Piccinini et al. |
| 2003/0222890 A1 * | 12/2003 | Salesin ............ G06F 17/30017 345/629 |
| 2006/0020895 A1 * | 1/2006 | Keohane ................ G09B 5/02 715/732 |
| 2008/0155422 A1 | 6/2008 | Manico et al. |
| 2008/0309647 A1 * | 12/2008 | Blose ............ G06F 17/30038 345/204 |
| 2009/0031229 A1 * | 1/2009 | Chen ................ G06F 8/10 715/764 |
| 2009/0138332 A1 | 5/2009 | Kanevsky et al. |
| 2009/0210796 A1 * | 8/2009 | Bhogal ................ G11B 27/105 715/730 |
| 2011/0047227 A1 * | 2/2011 | Arthurs ................ G06Q 10/107 709/206 |
| 2011/0047597 A1 * | 2/2011 | Mahaffey ............. G06F 21/564 726/3 |
| 2011/0119133 A1 * | 5/2011 | Igelman ............. G06Q 30/0261 705/14.58 |
| 2011/0179061 A1 | 7/2011 | Chilakamarri et al. |
| 2011/0246893 A1 | 10/2011 | Paas et al. |
| 2012/0159332 A1 | 6/2012 | Piccinini et al. |

OTHER PUBLICATIONS

U.S. Appl. No. 13/325,088, Final Office Action, filed Jul. 15, 2014, 12 pg.

U.S. Appl. No. 13/325,088, Notice of Allowance, filed May 20, 2015, 15 pg.

* cited by examiner

DYNAMIC PRESENTATIONS MANAGEMENT

CROSS-REFERENCE TO RELATED APPLICATIONS

This application is a Continuation of U.S. application Ser. No. 13/325,088, filed on Dec. 14, 2011, which claims priority benefit of European Patent Application Number 10195321.4, filed on Dec. 16, 2010, and entitled "METHOD AND SYSTEM FOR DYNAMIC PRESENTATIONS MANAGEMENT," the entirety of which is incorporated herein by reference.

BACKGROUND

Nowadays, one of industry's main concerns is about effectively communicating with both internal and external audiences. Frequently, electronic presentations are used for communicating to efficiently provide information to the respective audience. Presentations may be built on various technologies, but are all meant to communicate a variety of information to a variety of auditors.

To increase the efficiency of communication, it is desired to exploit a single presentation in different ways depending on the current circumstances at the moment when the presentation is held. These circumstances include the persons forming the audience, i.e., depending on their technical background or forming part of company internals or externals, as well as available time for holding the presentation. For example, a company's strategy is communicated differently to internal employees than to business partners or to customers. Also technical background information is usually omitted when providing information for marketing purposes. Such cases refer to entire slides as well as to a partial content of slides.

Accordingly, a presentation may require updating depending on the above given considerations. This implies that certain information is shown or not shown to the audience or provided in a different way. This requires that slides of the presentation have to be rearranged or omitted, and/or the content of a slide has to be modified. One approach is modifying a presentation each time it is shown depending on the above circumstances. This requires a huge amount of manual work each time the presentation has to be shown under different circumstances.

Another approach is maintaining a set of similar presentations covering the same topic, taking into account the above considerations. Therefore, when the presentation has to be modified, the entire set of presentations has to be modified, which is time-consuming and easily leads to inconsistencies between the different presentations.

It is further known in the art, e.g. from the U.S. Pat. No. 7,512,887 B2 to assign one or more presentation constraint parameters to the slides of a presentation, so that all slides can be kept in one presentation, but are presented to the audience depending on the constraint parameter. This has still the drawback that the constraint parameter has to be set manually by a person holding the presentation and is easily forgotten to be updated. Accordingly, there is certain probability that a presentation will be shown, which is not provided for the present audience. Also dynamic modifications of the presentation are not possible.

BRIEF SUMMARY

One embodiment can include a method for dynamic presentations management of electronic presentations including multiple slides, wherein each slide has at least one presentation constraint parameter assigned thereto, and wherein a presentation software is used for generating and displaying the presentation can include gathering metadata regarding the presentation by the presentation software, evaluating the metadata regarding the presentation and determining at least one presentation constraint parameter by the presentation software, and automatically arranging, using a processor, slides according to the determined at least one presentation constraint parameter to be presented by use of the presentation software.

Another embodiment can include a method for dynamic presentations management of electronic presentations including multiple slides, wherein each slide has at least one presentation constraint parameter assigned thereto, and wherein a presentation software is used for generating and displaying the presentation an include gathering metadata regarding the presentation by the presentation software, evaluating the metadata regarding the presentation and determining at least one presentation constraint parameter by the presentation software, and automatically modifying, using a processor, a content of slides according to the determined at least one presentation constraint parameter to be presented by use of the presentation software.

Another embodiment can include a computer program product that includes a computer-usable storage medium including computer-usable program code embodied therewith. The computer-usable program code configured to perform the various operations and/or functions described within this specification.

Another embodiment can include a system for dynamic presentations management of electronic presentations including multiple slides. The system can include a processor configured to initiate the various operations and/or functions described within this specification.

BRIEF DESCRIPTION OF THE SEVERAL VIEWS OF THE DRAWINGS

Preferred embodiments of the invention are illustrated in the accompanied figures. These embodiments are merely exemplary, i.e., they are not intended to limit the content and scope of the appended claims.

DETAILED DESCRIPTION

Figure 1:
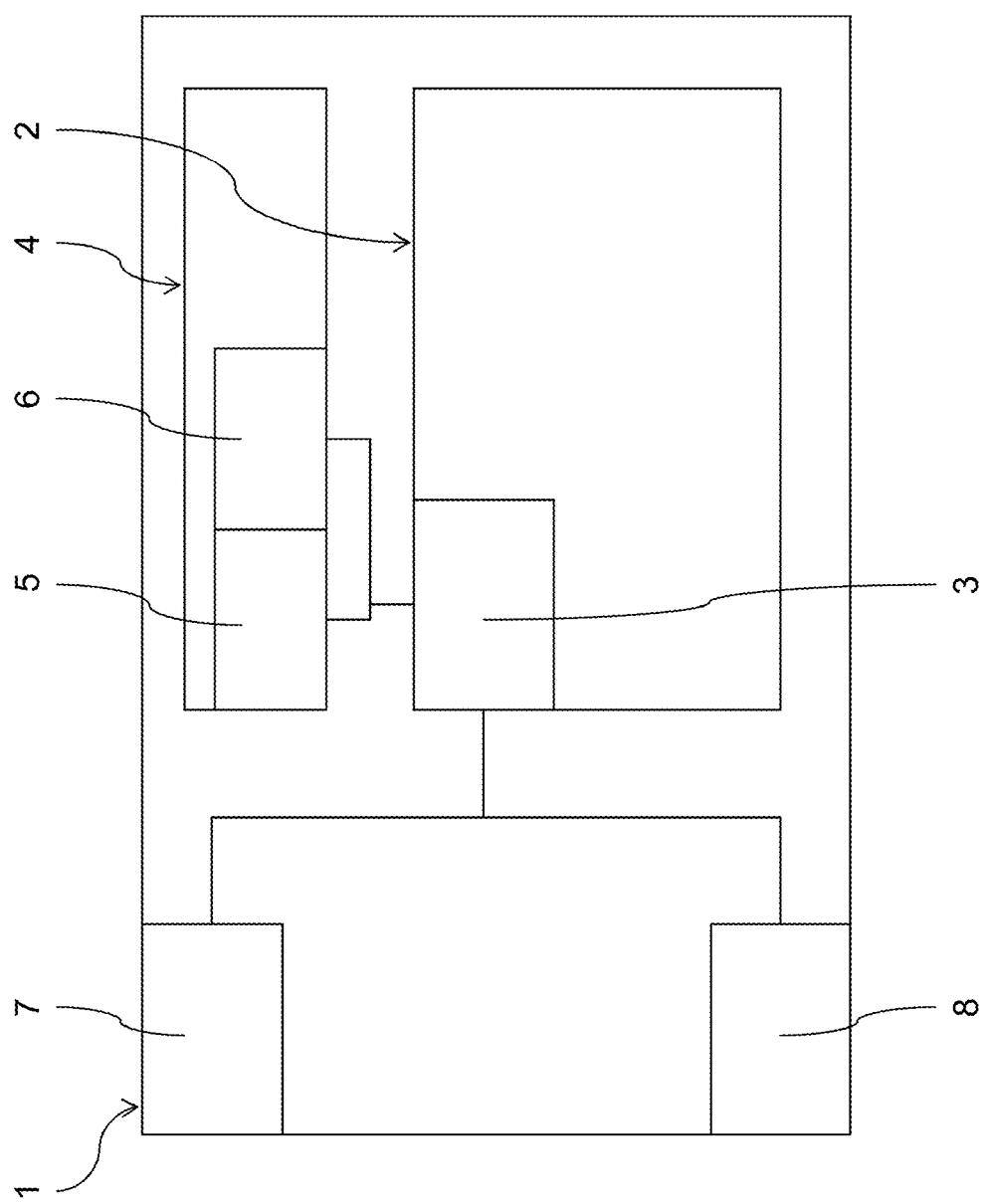
FIG. 1 shows a system for giving electronic presentations as a schematic diagram.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to a method and a system for dynamic presentations management of electronic presentations including multiple slides, whereby each slide has at least one presentation constraint parameter assigned thereto for arranging and/or selecting slides to be shown and/or modifying a content of slides. The present invention further relates to a computer-readable medium containing a set of instructions that causes a computer to perform the above method a computer program product for executing the above method.

It is an object of the embodiments of the invention to provide a method and a system for presentation management of electronic presentations, which allows automatic and dynamic updating of presentations to be shown and to overcome the problems discussed within this specification.

This object can be achieved by the independent claims. Advantageous embodiments are detailed in the dependent claims.

In one aspect, this object can be achieved by a method for dynamic presentations management of electronic presentations including multiple slides, whereby each slide has at least one presentation constraint parameter assigned thereto, whereby a presentation software is used for generating and displaying the presentation. The method can include steps of gathering metadata regarding the presentation by the presentation software, evaluating the metadata regarding the presentation and determining at least one presentation constraint parameter by the presentation software, and automatically arranging and/or selecting slides and/or modifying a content of slides according to the determined at least one presentation constraint parameter to be presented by use of the presentation software.

The object can be further achieved by a system for dynamic presentations management of electronic presentations including multiple slides including a storage device for storing computer usable program code and a processor for executing the computer usable program code to perform the above method.

The object also can be achieved by a computer-readable medium such as a storage device, a floppy disk, compact disc, CD, digital versatile disc, DVD, Blu-ray disc, or a random access memory (RAM) containing a set of instructions that causes a computer to perform the above method and a computer program product comprising a computer-usable medium including computer-usable program code, wherein the computer-usable program code is adopted to execute the above method.

Another aspect is to automatically modify the presentation by arranging and/or selecting slides to be shown and/or modifying the contents of slides depending on metadata regarding the presentation. Metadata can be any kind of information in respect to the content of the presentation, which can be gathered in any suitable way. Further details regarding gathering and evaluating the metadata are provided below. According to this metadata, the constraint parameter is automatically updated to modify the presentation.

A system according to an embodiment of the invention can be implemented on a standalone computer with a presentation software running thereon, whereby the presentation software is adopted to execute the method(s) disclosed herein. Furthermore, it is possible to provide a plug-in for existing presentation software, where the plug-in provides the functionality required for executing the method(s) disclosed herein.

In a modified embodiment of the present invention, the step of automatically arranging and/or selecting slides according to the determined at least one presentation constraint parameter to be presented by use of the presentation software comprises automatically generating an agenda of the presentation based on the arranged and/or selected slides to be presented by use of the presentation software. The agenda provides an overview of what is to be shown in the presentation and has to cover the content of the presentation. If an agenda is already provided, this step also refers to updating the agenda according to the presentation to be shown.

In a preferred embodiment of the invention the step of gathering metadata regarding the presentation by the presentation software can include gathering information regarding the audience, the location, and/or the schedule of the presentation and combining the gathered information with metadata regarding the audience, the location, and/or the schedule of the presentation. The identification of the audience, the location and the schedule is helpful, when this information is interpreted by the metadata. The metadata regarding the audience can be for example the position of a person and the company a person belongs to, lists of locations of companies for combination with pure position information, and the time and/or the time duration of a presentation including e.g. a time zone. The audience is important to evaluate a most suitable scope for the presentation. Technical information is most suitable to be provided to technicians, whereas marketing information is most suitable to be presented to sales persons. Audience from the company of the holder of the presentation, i.e., an internal audience, compared to audience from outside the company, i.e., external audience, has an impact on the shown presentation, e.g., when confidential information is involved in the presentation. Also the location of the presentation is important, since a location within the company of the holder of the presentation most probably is an indication for audience from inside the company. If the presentation is held outside the company, it is most probable that the presentation is held to an external audience. The location can also have impact on a language used for the presentation and the way a presentation is held, e.g., when a presentation is held in a foreign country, slides in a local language or slides containing for example graphics for illustrating technical matter can be shown to improve the understanding of the presentation. Also the schedule of the presentation can have impact on the presentation. If presentation time is limited, only a subset of slides can be shown to the audience.

According to a modified embodiment of the present invention the step of gathering information regarding the audience, the location, the schedule of the presentation comprises evaluating information from a personal information management system of a person holding the presentation. The personal information management software is used in almost all companies. Common representatives of personal information management (PIM) systems are Microsoft Outlook and Lotus Notes. Other PIM systems are also available and can be used in a similar way. The PIM system usually includes a calendar, which can be evaluated to determine the time and duration of the presentation. Furthermore, if the audience can be invited and provide feedback, e.g., by accepting or denying participation in the presentation. Similarly, information can be extracted from emails being exchanged in respect to a presentation. An analysis of the emails can provide the metadata. Furthermore, contacts as stored in the PIM can provide metadata regarding the audience, when a company or a position of a person assisting to the presentation is available. Also the location can be determined based on PIM information, e.g., when the auditors are located in a certain area.

According to a preferred embodiment of the present invention the step of evaluating information from a personal information management system of a person holding the presentation includes evaluating a constraint parameter assigned in the personal information management system, e.g., in a calendar entry of the presentation, in accordance with the at least one presentation constraint parameter. When scheduling a presentation, the constraint parameter can directly be set in the PIM system, so that it does not have to be further evaluated. The parameter can be set for example in the respective calendar entry.

According to a preferred embodiment of the present invention the step of gathering information regarding the audience, the location, the schedule of the presentation comprises evaluating information from a personal information management system of at least one member of the audience. Evaluated information refers to e.g. the company and position of the member of the audience as well as an address for evaluating the location. Also other information can be evaluated, e.g. a conflict in the calendar of a member of the audience. A calendar entry of the respective person, which only indicates a partial assistance to the presentation, can be considered for modifying the presentation. Furthermore, in case of delays of the presentation, the calendar of members of the audience can be evaluated to verify, if the persons have subsequent appointments. If not, it can be suitable to extend the duration of the presentation to achieve the object of the presentation, instead of reducing the number of remaining slides to be shown in order to comply with the scheduled time.

In another embodiment of the present invention the step of gathering information regarding the audience, the location, the schedule of the presentation can include activating at least one mobile communication device connected to a computer for running the presentation software, requesting identification messages from mobile communication devices of at least parts of the audience, and evaluating received identification messages. The communication device can be provided also internally inside the computer. Also a connection to a communication device which serves as an entrance system to the place of the location can be evaluated. Suitable technologies are for example RFID, Bluetooth or WIFI, which are common in nowadays mobile phones, which most people take with them all the time. The identification message can contain plain information regarding the holder of the device, e.g., its name, company and/or position is taken for example from a V-card or an assigned device name. When the communication device only returns a device identification, for example an IMEI of a mobile phone or a Bluetooth address, a user can be identified by metadata, which connects the device identification with a person. The metadata can be taken from the PIM or another source of information.

According to a further embodiment of the present invention the step of gathering information regarding the audience, the location, the schedule of the presentation can include evaluating positioning information of the computer, especially a GPS signal, an AGPS signal or positioning information based on detection of available communication networks. Different localization technologies are known in the art and can be used for identifying the place of the presentation, e.g., GPS coordinates can be matched with a map, especially an electronically available map to determine the current place. Also identification of local wireless networks, e.g., installed Bluetooth or WIFI networks can be used for determining the current position, e.g., by evaluating a network name. Similarly, an assigned IP address in a local area network (LAN) can indicate positioning information regarding the current place.

In another embodiment of the present invention the step of combining the gathered information with metadata regarding the audience, the location, and/or the schedule of the presentation can include the step of receiving metadata from a database. The database can include any kind of suitable information, e.g., maps, personal information regarding persons or whatever piece of information suitable for the purpose of invention. The PIM information can be stored, as most common in companies, on a central server. Accordingly, more reliable information is available regarding the PIM.

According to another embodiment of the present invention the step of receiving metadata from a database can include receiving a company and/or a position of a member of the audience. The information can be stored directly in the database, e.g., in a database of the company of the person holding the presentation, or by a third party. Furthermore, receiving metadata from a database can include receiving information directly from the internet, e.g., from company websites providing details regarding their locations and employees.

In another embodiment of the present invention the step of automatically arranging and/or selecting slides from the presentation according to the determined at least one presentation constraint parameter can include arranging and/or selecting slides during the course of the presentation. The presentation can be updated, e.g., when a person having a specific interest or background enters or leaves the presentation or depending on the current time compared to the scheduled duration of the presentation. If it turns out that a presentation time will most probably be exceeded, slides can be removed automatically from the remaining presentation to be shown.

In still another embodiment of the present invention the step of gathering metadata regarding the presentation by the presentation software can include gathering feedback from the audience. The feedback can be a request for specific content to be shown in the presentation. The feedback can for example be provided electronically via the PIM, or by a transmission of a message via a communication device connected to the system for holding the presentation. It can be provided in advance or during the presentation.

Now referring to FIG. 1, a system for dynamic presentations management can be seen. The system comprises a hardware platform 1, which can be any suitable computer. Especially, laptops are commonly used. The computer has a presentation software 2 running thereon, which is a standard presentation software 2, e.g. Microsoft® PowerPoint®. The presentation software 2 can include a plug-in 3, which implements the inventive method. The plug-in 3 is connected to a personal identification management software 4, also called PIM software, in particular to a calendar application 5 and an email client 6. The plug-in 3 is further connected to a network connector 7 and a Bluetooth module 8, which are chosen by way of example as implementations of communication devices.

Figure 2:
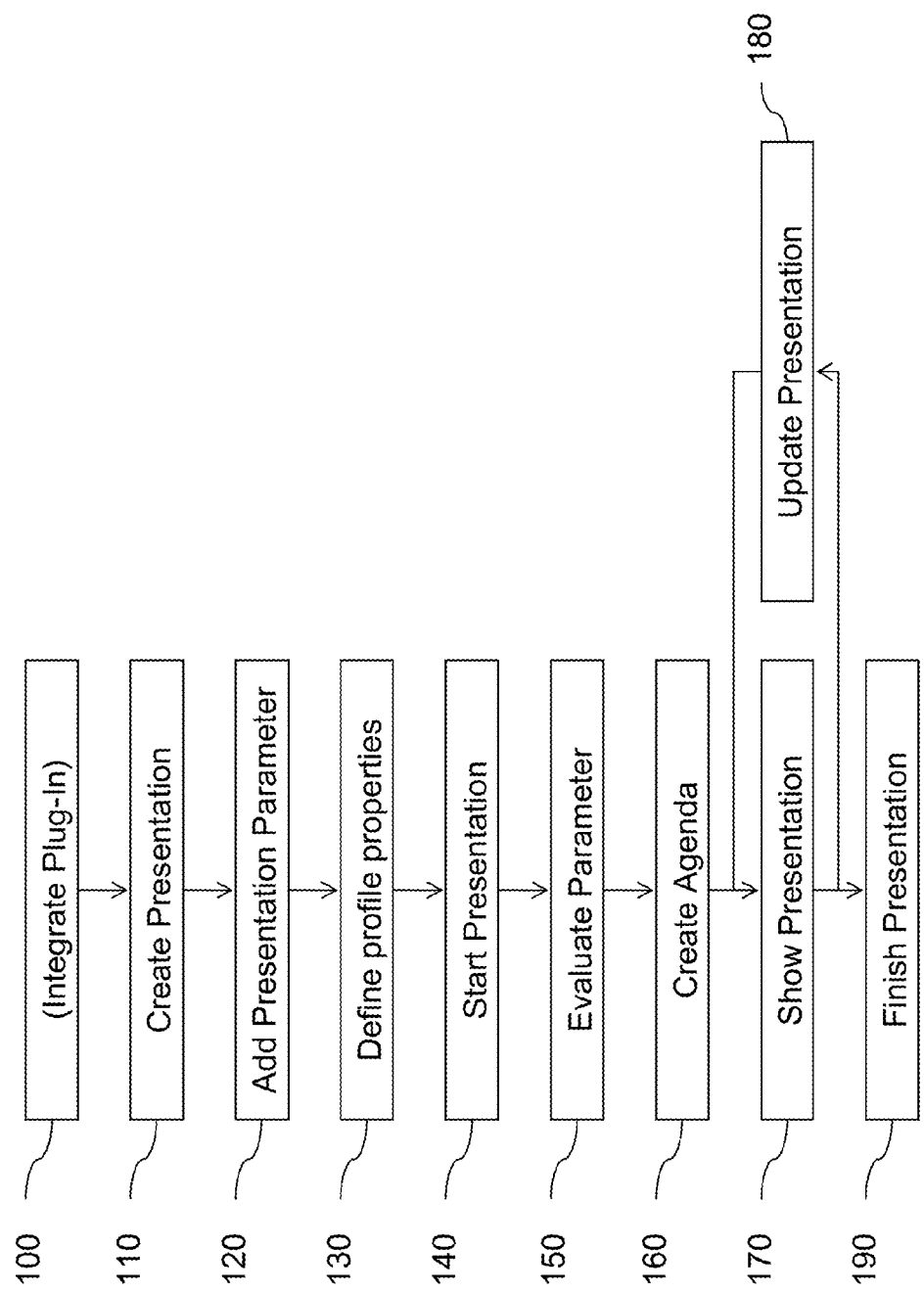
FIG. 2 shows an implementation of an inventive method for managing an electronic presentation according to a first embodiment of the present invention in a flowchart.

Referring now to FIG. 2, a first embodiment of the inventive method is described.

In step 100, the plug-in 3 is integrated into the presentation software 2. This refers to a standard software installation, which has to be performed only once when the inventive method is executed for the first time on the computer 1.

Figure 3:
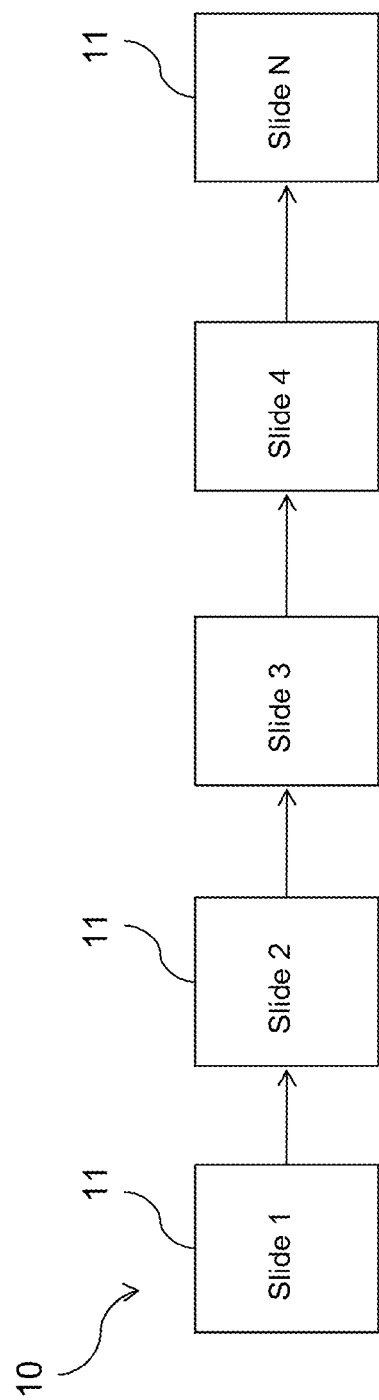
FIG. 3a shows a presentation comprising multiple slides arranged in a first way as a schematic diagram.
FIG. 3b shows the presentation of FIG. 3A arranged in a second order.

Step 110 refers to the creation of a presentation 10 including multiple slides 11, as shown in FIGS. 3a and 3b. This step is well-known in the art and is not further explained. It is apparent to a person skilled in the art that the presentation 10 can also be created in advance and can be loaded in step 110 to be used for the inventive method.

According to step 120, at least one presentation constraint parameter is added to the presentation 10. The at least one presentation constraint parameter defines the course of the presentation 10 depending on the parameter value. This includes the selection and arrangement of slides 11 as well as a modification of their content.

In step 130, further profile properties are defined. This allows further filtering or grouping of slide elements defining a point of time and a place, when/where the agenda is created. Initially, the position of the agenda slide 11 within the presentation is defined.

In step 140, the presentation 10 is started. In this embodiment of the present invention, starting the presentation 10 is done prior to updating the presentation 10, as described below.

Updating the presentation 10 starts with the evaluation of the at least one constraint parameter in step 150. Evaluation of the parameter comprises identifying the audience, the location and the schedule of the presentation 10. Accordingly, the plug-in 3 contacts the PIM software 4 the calendar 5 provides the duration of the presentation 10, so that the number of slides 11 of the current presentation 10 can be updated according to the available time. Furthermore, the calendar entry contains a location where the presentation 10 is held. This identifies, if the presentation 10 is held internally or externally. Furthermore, additional information from the email client 6 is evaluated, e.g. emails in response to an invitation to assist to the presentation 10 are evaluated regarding requests of specific topics to be discussed in the presentation 10. The calendar application 5 furthermore provides a list of auditors, which have been invited to assist to the presentation 10. The plug-in 3 connects via the LAN adapter 7 to an external data base, which is not shown in the figures, which provides detailed information regarding the technical background of the auditors. Furthermore, the plug-in 3 contacts with the Bluetooth module 8, which starts searching for Bluetooth devices that are available in the area. Each Bluetooth device responds, if a respective mode is set in the device, with an identity message containing a unique Bluetooth address, which is transferred to the plug-in 3 for further identification of the respective user of the device via the LAN adapter 7 from the external database. Accordingly, the list of available auditors is updated compared to the list of scheduled auditors, e.g., in the case an auditor has been replaced by another or could not attend without being able to reject the invitation for the presentation 10.

Depending on the evaluation of the at least one constraint parameter, in step 160 an agenda of the presentation 10 is created. This agenda shows the presentation 10 as for example shown in FIG. 3a consisting of set of N slides 11, which are arranged in the shown order. Accordingly, the slides 11 are selected and/or arranged and/or the content of slides 11 is modified.

The presentation 10 is then shown in step 170 as arranged according to FIG. 3a.

During the course of the presentation 10, the presentation 10 can be updated in step 180, e.g., when the plug-in 3 evaluates by a use of the Bluetooth device 8 receiving an identification message, that another auditor with a different technical background enters the presentation 10. Accordingly, the presentation 10 is rearranged, as shown by way of example in FIG. 3b. In this example, only the slides 11 are ordered in a different way. It is also possible to omit or add slides 11 or to modify the content of slides 11 depending on the constraint parameter.

According to step 180, the presentation is finished.

Figure 4:
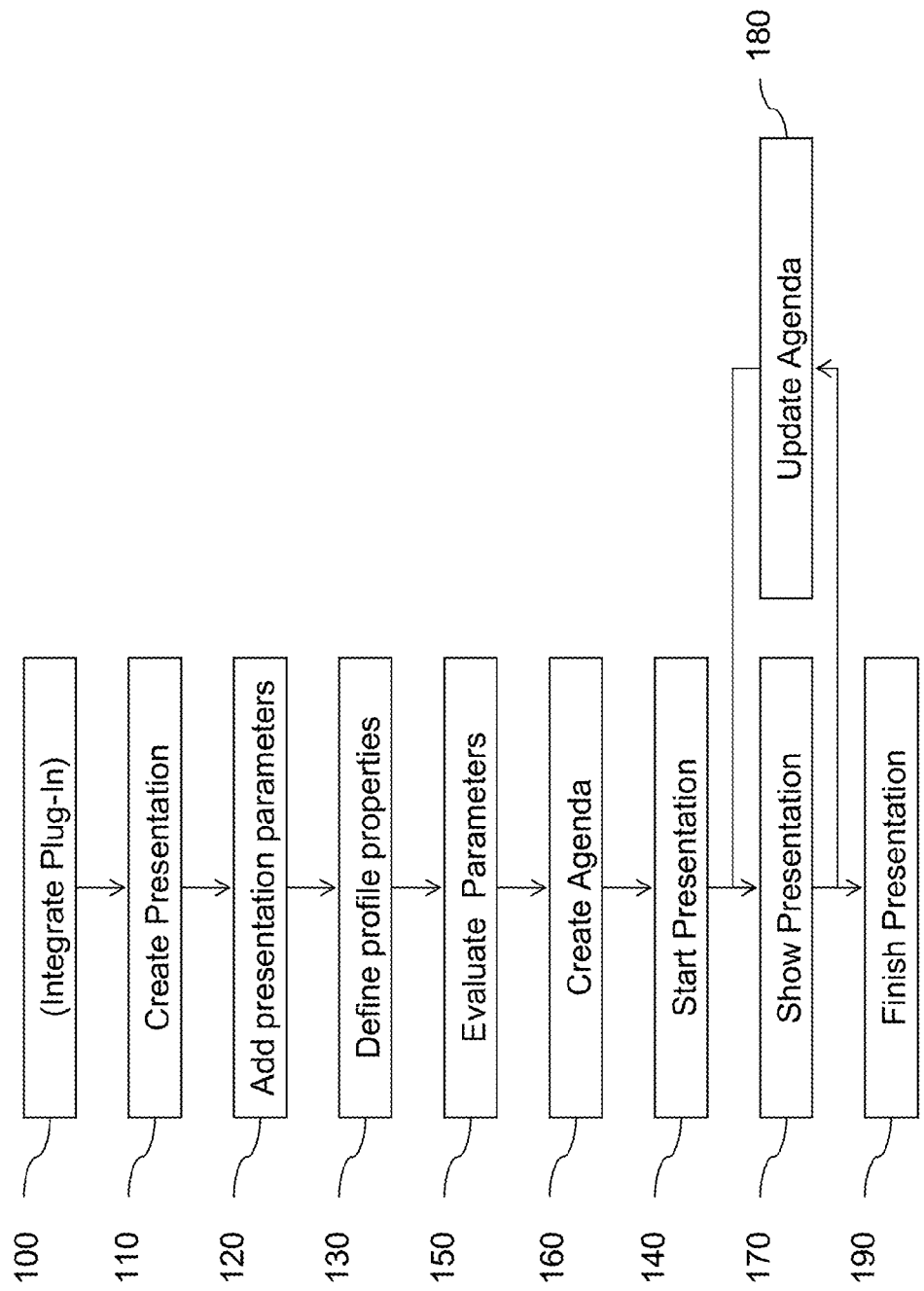
FIG. 4 shows a flowchart of a second embodiment of the inventive method.

Referring now to FIG. 4, an implementation of the inventive method according to a second embodiment of the present invention can be seen. The method is similar to the one of the first embodiment, where only some steps have been rearranged. Also the underlying system is identical to the one of the first embodiment.

According to the second embodiment of the present invention, the steps 100 to 130 are performed as described with respect to the first embodiment of the present invention. Then, steps 150 and 160 according to the first embodiment of the present invention are performed. Accordingly, the presentation 10 is modified before it is started. This allows for a person holding the presentation 10 to prepare in advance depending on the presentation 10 as it will be shown later.

Subsequently in step 140, the presentation 10 is started as described with respect to step 140 of the first embodiment of the present invention.

The method then continues with step 170 according to the first embodiment of the present invention as already described earlier.

Further changes to the method according to the first embodiment of the present invention are not implemented in the second embodiment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been illustrated and described in detail in the drawings and fore-going description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A computer-implemented method for electronically presenting a presentation including multiple slides, each slide having at least one presentation constraint parameter assigned thereto, comprising:
 gathering metadata regarding the presentation;
 modifying, based upon the gathered metadata, one of the at least one presentation constraint parameter; and
 modifying, automatically, a content of at least one of the multiple slides based upon the modified at least one presentation constraint parameter, wherein the gathered metadata includes feedback from an audience of the presentation and the feedback is from an email associated with the presentation.

2. The method of claim 1, further comprising
 rearranging, automatically, the multiple slides based upon the gathered metadata.

3. The method of claim 2, wherein
 the rearranging occurs contemporaneously with the presentation.

4. The method of claim 1, wherein
 the gathered metadata includes at least one of information regarding an audience of the presentation,
 a location of the presentation, and
 a schedule of the presentation.

5. The method of claim 1, wherein
 the gathering the metadata includes:
 activating a mobile communication device to request identification messages from audience mobile communication devices, and
 evaluating the identification messages received from the audience mobile communication devices.

6. A computer hardware system for electronically presenting a presentation including multiple slides, each slide having at least one presentation constraint parameter assigned thereto, comprising:
 a hardware processor configured to initiate the follow operations:
 gathering metadata regarding the presentation;
 modifying, based upon the gathered metadata, one of the at least one presentation constraint parameter; and
 modifying, automatically, a content of at least one of the multiple slides based upon the modified at least one presentation constraint parameter, wherein the gathered metadata includes feedback from an audience of the presentation and the feedback is from an email associated with the presentation.

7. The system of claim 6, further comprising rearranging, automatically, the multiple slides based upon the gathered metadata.

8. The system of claim 7, wherein the rearranging occurs contemporaneously with the presentation.

9. The system of claim 6, wherein the gathered metadata includes at least one of information regarding
an audience of the presentation,
a location of the presentation, and
a schedule of the presentation.

10. The system of claim 6, wherein the gathering the metadata includes:
activating a mobile communication device to request identification messages from audience mobile communication devices, and
evaluating the identification messages received from the audience mobile communication devices.

11. A computer program product for electronically presenting a presentation including multiple slides, each slide having at least one presentation constraint parameter assigned thereto, comprising:
a storage hardware device having computer-usable program code stored therein, the computer-usable program code, which when executed by a computer hardware system, causes the computer hardware system to perform:
gathering metadata regarding the presentation;
modifying, based upon the gathered metadata, one of the at least one presentation constraint parameter; and
modifying, automatically, a content of at least one of the multiple slides based upon the modified at least one presentation constraint parameter, wherein the gathered metadata includes feedback from an audience of the presentation and the feedback is from an email associated with the presentation.

12. The computer program product of claim 11, further comprising
rearranging, automatically, the multiple slides based upon the gathered metadata.

13. The computer program product of claim 12, wherein the rearranging occurs contemporaneously with the presentation.

14. The computer program product of claim 11, wherein the metadata includes at least one of information regarding
an audience of the presentation,
a location of the presentation, and
a schedule of the presentation.

* * * * *